United States Patent [19]

Albares

[11] 4,291,984
[45] Sep. 29, 1981

[54] OPTICAL AMPLIFICATION FOR THE FIBER INTERFEROMETER GYRO

[75] Inventor: Donald J. Albares, San Diego, Calif.

[73] Assignee: The United States of America as represented by the Secretary of the Navy, Washington, D.C.

[21] Appl. No.: 95,868

[22] Filed: Nov. 19, 1979

[51] Int. Cl.³ .............................................. G01B 9/02
[52] U.S. Cl. .................................................. 356/350
[58] Field of Search ......................... 356/350; 455/601

[56] References Cited

PUBLICATIONS

Vali et al., "Fiber Ring Interferometer", *Applied Optics*, vol. 15, No. 5, pp. 1099–1100, May 1976.

Chown, "Repeaters for Optical Communications Systems", *Optical Repeaters*.

*Primary Examiner*—John K. Corbin
*Assistant Examiner*—Matthew W. Koren
*Attorney, Agent, or Firm*—R. S. Sciascia; G. J. Rubens; T. G. Keough

[57] ABSTRACT

An improvement for a fiber interferometer gyro provides for greater rotation rate sensitivity. The gyro has a single mode fiber coiled about an identical area a great number of times. A single external laser sends pulses of energy which are split and passed in opposite directions through the coiled fiber and a pair of optical amplifiers inserted to amplify the energy pulses. This permits the length of the coiled fiber to be increased and, hence, provides for greater interferometer sensitivity.

3 Claims, 1 Drawing Figure

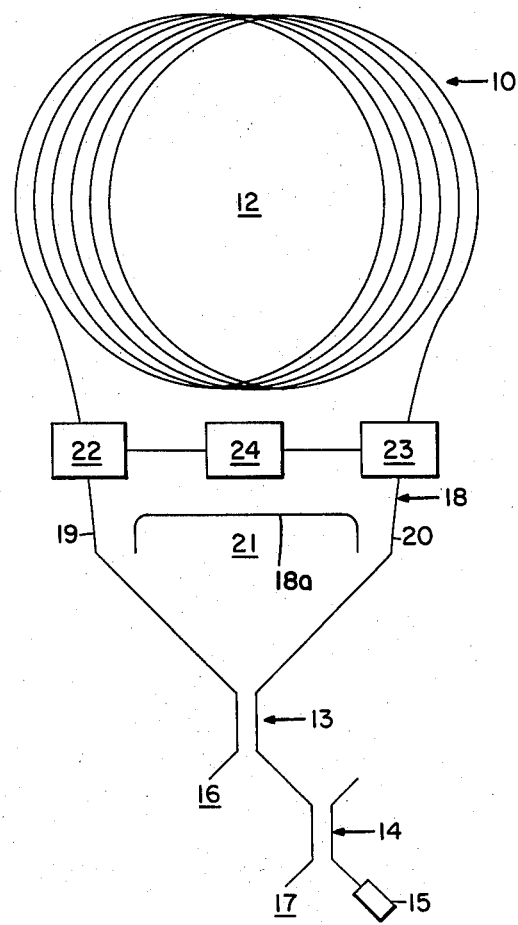

OPTICAL AMPLIFICATION FOR THE FIBER INTERFEROMETER GYRO

CROSS REFERENCE TO RELATED APPLICATIONS

This is an improvement of the invention entitled "Three dB Single Mode Optical Fiber Interferometer Beamsplitter/Coupler" by Matthew N. McLandrich, United States Patent and Trademark Office, Ser. No. 14,798 filed Feb. 26, 1979 and the invention entitled "Method of Fiber Interferometry Zero Fringe Shift Referencing Using Passive Optical Couplers" by Matthew N. McLandrich, United States Patent and Trademark Office, Ser. No. 30,202 filed Apr. 16, 1979.

BACKGROUND OF THE INVENTION

The advantages of fiber interferometer gyros over mechanical gyros and ring laser gyros have been recognized. Briefly, the mechanical gyros have shown a tendency for parts to wear and fail; they are relatively bulky and heavy; and, at times, their power consumption rates are excessive, to name a few. Some of the inherent limitations of the mechanical devices were thought to be partially remedied by the ring laser gyro. The ring laser gyro is a digital output device with no spinning mass element to rebalance. The ring laser also is capable of handling high rate inputs. It is close to being an ideal strap down sensor, easily interfaced with a digital computer and it is relatively rugged, long-lived, and reliable due to its simple optical quality construction. However, at the present state of development, ring laser gyros suffer limitations due to nonlinear "pulling" and "lock-in" at low rotation rates. In addition, the ring laser gyro production cost appears to be significantly higher than the emerging family of fiber interferometer gyros which are now in research and development.

Fiber optic gyros have been proposed by V. Vali and R. W. Shorthill as Fiber Laser Gyroscopes at the East Coast Conference of the SPIE in Reston, Virginia on Mar. 22 and 23 of 1976. In a follow-up article in the Proceedings of Conference on Fibers Integrated Optics a typical fiber ring interferometer was disclosed. It used an arrangement of conventional beamsplitters and lenses to introduce clockwise and counterclockwise pulses in a coiled optical fiber. The interference patterns were observed and rotation rates could be determined. Improvements over this typical fiber ring interferometer were disclosed in the referenced applications to provide for more responsive rotation rate indications.

The typical interferometer of Vali and Shorthill and the improvements of the applications have sensitivities which depend on the size of the area encircled by the optical fiber. Coiling the fiber around this area multiplies the sensitivity of the interferometer by the number of turns. A limitation is apparent in that the attenuation figure of the fiber limits its total length and, hence, imposes a limit on the interferometer's sensitivity. Thus, there is a continuing need in the state-of-the-art for a means to improve fiber interferometer gyro sensitivity without unduly complicating this otherwise straightforward device.

SUMMARY OF THE INVENTION

The present invention is directed to providing an improvement for a pulsed fiber interferometer gyro having a single external laser launching energy bidirectionally through a single mode fiber coiled about an identical area a plurality of times. An optical amplifying medium is coupled to the coiled single mode fiber for amplifying the bidirectionally launched energy. This permits greater interferometer sensitivity by increasing the magnitude of the projected bidirectional energy to allow the single mode fiber to be of greater length.

It is a prime object of the invention to provide for an improved fiber interferometer gyro.

Yet another object is to provide for an improved fiber interferometer gyro having a longer coiled fiber for increased sensitivity.

Still another object of the invention is to provide a pair of amplifiers interposed in an optical path of the fiber interferometer gyro for increasing the magnitude of transmitted pulses.

Yet another object is to provide for a fiber interferometer gyro having a pair of optical amplifiers which allow the length of the coiled fiber to be much greater, increasing the interferometer's sensitivity.

These and other objects of the invention will become more readily apparent from the ensuing specification and claims when taken with the drawings.

BRIEF DESCRIPTION OF THE DRAWING

The FIGURE depicts the improvement of this invention optically cooperating with conventional elements in a fiber interferometer gyro.

DESCRIPTION OF THE PREFERRED EMBODIMENT

Referring now to the drawing, an improved fiber interferometer 10 has a single mode optic fiber 11 wound in a coil about an area 12. Bidirectionally traveling pulses of energy are introduced by a pair of beamsplitter/couplers 13 and 14. The pulsed laser energy is projected from a pulsed laser source 15 and interference patterns are observed or electronically monitored by a pair of photodetectors 16 and 17. A referencing section 18 is added to the fiber interferometer to provide an indication of signal response variation by the photodetectors or the laser. Pulsed laser energy is tapped into the referencing section by another pair of beamsplitter/couplers 19 and 20 which are substantially the same as 13 and 14. A length of a single mode optical fiber 18a extends between beamsplitter/couplers 19 and 20 to encompass a negligible referencing area 21 as compared to the size of area 12.

The beamsplitter/couplers are any of a number of known designs such as the type disclosed in the first above referenced patent application. The interferometer described above is substantially the same as described in the second above referenced patent application or it could be the Vali-Shorthill design. In any event, the fiber interferometer gyro is a highly promising candidate for providing responsive indications of angular motion and rate of change of motion. It is lightweight and relatively free of the disadvantages of mechanical and ring laser gyros.

The sensitivity of a fiber interferometer gyro is proportional to the area A encircled by the fiber. It has been found that the gyro's sensitivity can be increased without increasing the size of the gyro by coiling the fiber around the same area N times to encircle an effective area having the size AN. The effective area AN can be expressed as a function of the total fiber length L by the relationship where R is the radius of the fiber encircled area A.

This innovative concept of this invention can greatly increase the sensitivity of the conventional interferometers since they are limited in fiber length to about several hundred meters by the attenuation factor of the fiber. By providing a means for increasing the length L of the fiber to, say, several kilometers, the sensitivity of the interferometer can be greatly increased. This improvement seeks to increase interferometer sensitivity by making it possible to increase the coiled fibers' length to 8 kilometers or greater.

A pair of solid state diode amplifiers 22 and 23 are asymmetrically interposed in the fiber and are actuated by a common control circuit 24.

The two amplifiers are synchronized by the control circuit 24 so that when the clockwise and counterclockwise pulses of energy arrive at one or the other of the amplifiers they are actuated for amplification. A clockwise pulse is amplified as it reaches amplifier 22. The pulse travels nearly the entire length of coiled optic fiber 11 and when it arrives at amplifier 23 it is reamplified. Similarly, a counterclockwise pulse is amplified first by amplifier 23 and after having traveled the length of the optic fiber, it is once more again amplified at amplifier 22. The twice amplified clockwise and counterclockwise pulses then pass to the detectors or other suitable monitoring instrumentation for additional processing.

Solid state diode amplifiers are available within the state-of-the-art having 10 dB gain with multimode transmission. Single mode operation, such as anticipated in the present invention, is obtained in laser diodes (oscillators). The amplifiers could be a buried heterojunction diode or other active medium such as gas, GaAlAs or Nd:YAG giving optical gain at the proper source wavelength, i.e. the same as the laser 15. If the 10 dB gain were realized by the amplifiers, this would allow 20 dB additional attenuation length of the fiber. The formula for the optimum length of the fiber, that length which gives the best signal to noise ratio, assuming a photon noise limited operation is expressed in kilometers as $4.3/\alpha$ where $\alpha$ is the attenuation figure in dB/kilometer. With amplification, g(dB), inserted the optimum length becomes $(4.3+g)/\alpha$. If we have an $\alpha$ of 5 dB/km then the optimum length is 0.86 kilometers and an additional 4 kilometers would increase the sensitivity of the gyro by a factor of 5.65. In general, the sensitivity increase is $(4.3+g)/4.3$.

Obviously, many other modifications and variations of the present invention are possible in the light of the above teachings. It is therefore to be understood that within the scope of the appended claims the invention may be practiced otherwise than as specifically described.

What is claimed is:

1. In a pulsed fiber interferometer gyro having a single external laser projecting clockwise and counterclockwise pulsed energy bidirectionally through a single mode fiber coiled about an identical area a plurality of times and a length of single mode optical fibers reaching between a pair of beamsplitter/couplers coupled to the coiled single mode fiber for encompassing a negligible area as compared to the identical area, an improvement therefor is provided comprising:

a first and a second means optically coupled to the coiled single mode fiber each between one of the beamsplitter/couplers and the coiled single mode fiber for amplifying the bidirectionally projected clockwise and counterclockwise pulsed energy to provide for greater interferometer sensitivity by increasing the strength of the projected bidirectional energy to allow the single mode fiber to be of greater length and means coupled to the first and second amplifying means for pulse actuating the first and second amplifying means when clockwise and counterclockwise pulses of energy arrive thereat.

2. An improved fiber interferometer according to claim 1 in which the amplifying means is a pair of solid state diodes amplifying asymmetrically located in the coiled fiber.

3. An improved fiber interferometer according to claim 2 in which the amplifiers are pulsed to amplify the clockwise and counterclockwise pulsed projected energy before and after it travels through the coiled fiber.

* * * * *